United States Patent
Yamada et al.

(10) Patent No.: US 8,195,975 B2
(45) Date of Patent: Jun. 5, 2012

(54) SEMICONDUCTOR INTEGRATED CIRCUIT DEVICE AND CLOCK CONTROL METHOD

(75) Inventors: Yutaka Yamada, Kanagawa (JP);
Takashi Yoshikawa, Kanagawa (JP);
Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 791 days.

(21) Appl. No.: 12/341,147

(22) Filed: Dec. 22, 2008

(65) Prior Publication Data

US 2009/0172458 A1 Jul. 2, 2009

(30) Foreign Application Priority Data

Dec. 26, 2007 (JP) ................................ 2007-334824

(51) Int. Cl.
*G06F 1/04* (2006.01)
(52) U.S. Cl. ...................................................... 713/600
(58) Field of Classification Search ................... 713/600, 713/300–340; 345/506
See application file for complete search history.

(56) References Cited

U.S. PATENT DOCUMENTS

| | | | | |
|---|---|---|---|---|
| 6,173,408 B1 * | 1/2001 | Jimbo et al. | ................... | 713/322 |
| 6,247,134 B1 * | 6/2001 | Sproch et al. | ................ | 713/320 |
| 6,324,643 B1 * | 11/2001 | Krishnan et al. | .............. | 712/237 |
| 6,412,062 B1 * | 6/2002 | Xu et al. | ........................ | 712/40 |
| 6,611,920 B1 * | 8/2003 | Fletcher et al. | ............... | 713/322 |
| 7,043,658 B2 * | 5/2006 | Chen et al. | .................... | 713/600 |
| 7,076,682 B2 * | 7/2006 | Jacobson | ...................... | 713/600 |
| 7,131,017 B2 * | 10/2006 | Schmit et al. | ................. | 713/323 |
| 7,535,790 B2 * | 5/2009 | Harada | ..................... | 365/233.12 |
| 7,747,844 B2 * | 6/2010 | McCormick et al. | ......... | 712/227 |
| 2006/0156046 A1 * | 7/2006 | Jacobson et al. | .............. | 713/300 |
| 2006/0218424 A1 * | 9/2006 | Abramovici et al. | ......... | 713/323 |
| 2007/0245131 A1 | 10/2007 | Yoshikawa | | |
| 2008/0244240 A1 | 10/2008 | Yoshikawa | | |
| 2009/0037674 A1 | 2/2009 | Yoshikawa et al. | | |

FOREIGN PATENT DOCUMENTS

| | | | |
|---|---|---|---|
| JP | 60218152 A | * | 10/1985 |
| JP | 11-167629 | | 6/1999 |
| JP | 3004968 | | 11/1999 |

OTHER PUBLICATIONS

U.S. Appl. No. 12/372,011, filed Feb. 17, 2009, entitled "Semiconductor Device and Data Processing Method Performed by Semiconductor Device".
U.S. Appl. No. 12/369,522, filed Feb. 11, 2009, entitled "Semiconductor Device".
Li, et al., "Deterministic Clock Gating for Microprocessor Power Reduction", Proceedings of The Ninth International Symposium on High-Performance Computer Architecture (HPCA-9), pp. 1-10, (2003).

* cited by examiner

*Primary Examiner* — Paul R Myers
(74) *Attorney, Agent, or Firm* — Finnegan, Henderson, Farabow, Garrett & Dunner, L.L.P.

(57) ABSTRACT

A plurality of operation units connected in a pipeline structure performs an operation processing on data. A process control unit operates in synchronization with a system clock signal and generates a process control signal for controlling the operation units upon receiving a data notification signal that notifies the process control unit of an arrival of data from outside. A clock-control signal generating unit operates in synchronization with the system clock signal and generates a clock control signal for controlling a clock supply to each of the operation units upon receiving the process control signal.

10 Claims, 12 Drawing Sheets

| DOES PROCESS CONTROL SIGNAL INDICATE TO EXECUTE PROCESSING? | CLOCK CONTROL SIGNAL S0 |
|---|---|
| YES | ENABLED |
| NO | DISABLED |

| DOES PROCESS CONTROL SIGNAL INDICATE TO EXECUTE PROCESSING? | IS CONTENT OF PROCESSING TO BE EXECUTED DIFFERENT FROM PRECEDING PROCESSED CONTENT | CLOCK CONTROL SIGNAL S1 | CLOCK CONTROL SIGNAL S2 |
|---|---|---|---|
| YES | YES | ENABLED | ENABLED |
| YES | NO | ENABLED | DISABLED |
| NO | — | DISABLED | DISABLED |

FIG.16

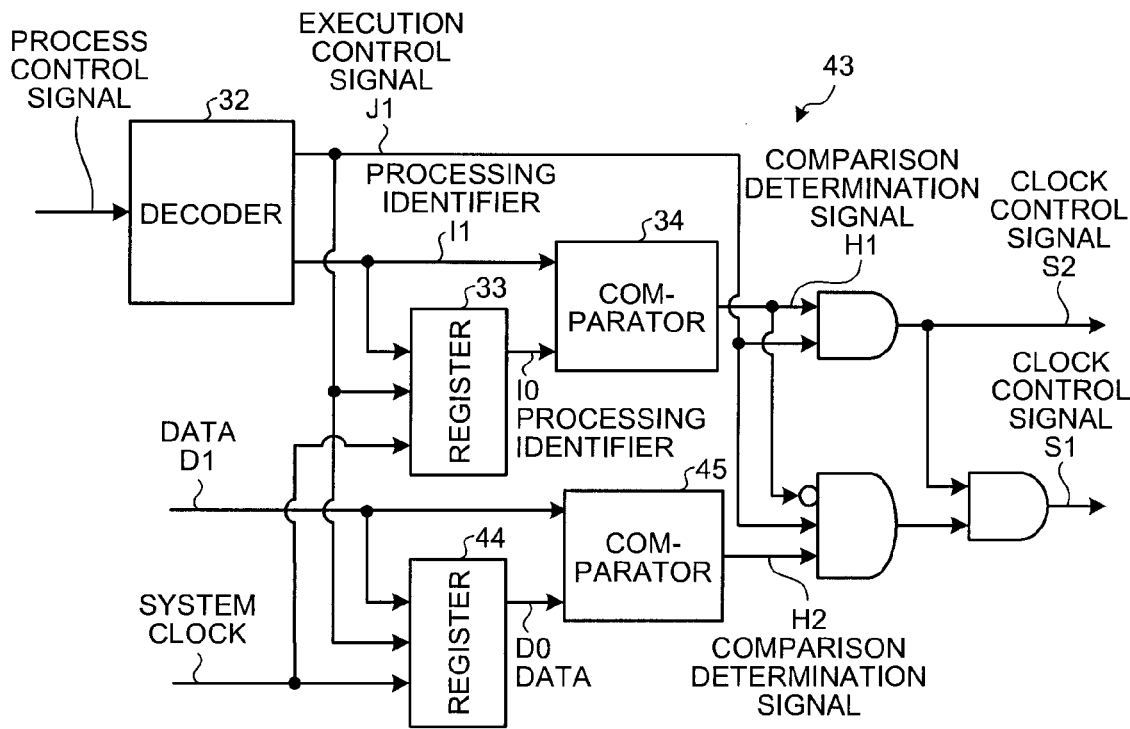

FIG.17

| DOES PROCESS CONTROL SIGNAL INDICATE TO EXECUTE PROCESSING? | IS CONTENT OF PROCESSING TO BE EXECUTED DIFFERENT FROM PRECEDING PROCESSED CONTENT | IS VALUE OF DATA TO BE PROCESSED DIFFERENT FROM DATA USED IN PRECEDING PROCESSING? | CLOCK CONTROL SIGNAL S1 | CLOCK CONTROL SIGNAL S2 |
|---|---|---|---|---|
| YES | YES | — | ENABLED | ENABLED |
| YES | NO | YES | ENABLED | DISABLED |
| YES | NO | NO | DISABLED | DISABLED |
| NO | — | — | DISABLED | DISABLED |

SEMICONDUCTOR INTEGRATED CIRCUIT DEVICE AND CLOCK CONTROL METHOD

CROSS-REFERENCE TO RELATED APPLICATIONS

This application is based upon and claims the benefit of priority from the prior Japanese Patent Application No. 2007-334824, filed on Dec. 26, 2007; the entire contents of which are incorporated herein by reference.

BACKGROUND OF THE INVENTION

1. Field of the Invention

The present invention relates to a semiconductor integrated circuit device that has a pipeline structure, and performs a data-dependent operation, with a capability of realizing low power consumption, and a clock control method for the semiconductor integrated circuit device.

2. Description of the Related Art

Recently, with an increase of speed and scale of a semiconductor integrated circuit device, there has been a growing demand for lower power consumption. A clock gating technology is generally used as one of approaches to reducing the power consumption of the semiconductor integrated circuit device.

A technology that applies the clock gating technology to a processor is disclosed in JP-A H11-167629 (KOKAI), which relates to a processor having a data-dependent clock gating function. The processor includes a process control unit that controls the start of operation, a plurality of operation units each performing an actual processing, and a clock control unit that supplies a clock to each of the operation units. The operation units are connected in a pipeline structure. When receiving an operation start signal from the process control unit, each of the operation units enables a request signal for requesting a clock supply to the clock control unit, and when the operation ends, disables the request signal. The clock control unit supplies a clock signal to each of the operation units only when the request signal from the operation unit is enabled.

Hai Li, et al., "Deterministic Clock Gating for Microprocessor Power Reduction", Proceedings of the HPCA-9, 2003 discloses a clock gating technology for a pipeline structure of a processor, in which the clock gating technology is applied by using a plurality of stages of the pipeline structure of a processor as an area of clock supply. It is determined by decoding a corresponding part in an execution command whether to provide clock supply to each clock supply area. For example, when a clock supply area inside the processor is divided into a command fetching unit, a command decoding unit, an integer operation unit, a floating-point operation unit, and a memory writing-back unit, to execute a floating-point operation instruction, clock supply to a computing unit for integer operation is stopped, and to execute a branch instruction, clock supply to the floating-point operation unit and to the memory writing-back unit is stopped.

However, according to the technology disclosed in JP-A H11-167629 (KOKAI), the process control unit controls all of the operation units, so that the circuits become complicated. Moreover, the process control unit individually controls settings and the start of processing each of the operation units, so that control of clock supply to each of the operation units is individually processed, consequently, each of the operation units needs a separated clock control unit. For this reason, because of complication of the control unit and increase in the number of units, power consumption by the processor is increased.

According to the literature by Hai Li, et al., processing for clock control, such as decoding of a command, needs to be performed with respect to each supply area of the same clock in the processor. For this reason, if a clock supply area is divided into small areas, such as stages of the pipeline, it results in increase in power consumption by the processor in turn.

SUMMARY OF THE INVENTION

According to one aspect of the present invention, there is provided a semiconductor integrated circuit device including a plurality of operation units connected in a pipeline structure, each performing an operation processing on data; a process control unit that operates in synchronization with a system clock signal and generates a process control signal for controlling the operation units upon receiving a data notification signal that notifies an arrival of data from outside; and a clock-control signal generating unit that operates in synchronization with the system clock signal and generates a clock control signal for controlling a clock supply to each of the operation units upon receiving the process control signal. Each of the operation units includes a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal.

Furthermore, according to another aspect of the present invention, there is provided a clock control method for a semiconductor integrated circuit device. The semiconductor integrated circuit device includes a plurality of operation units connected in a pipeline structure, each performing an operation processing on data, a process control unit that operates in synchronization with a system clock signal and generates a process control signal for controlling the operation units upon receiving a data notification signal that notifies an arrival of data from outside, and a clock-control signal generating unit that operates in synchronization with the system clock signal and generates a clock control signal for controlling a clock supply to each of the operation units upon receiving the process control signal. Each of the operation units includes a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal. The clock control method includes outputting including the clock control unit outputting a first clock control signal and outputting including the clock control unit outputting a second clock control signal. The first clock control signal indicates to perform the clock supply when the process control signal indicates an execution of a processing, and otherwise, not to perform the clock supply. The second clock control signal indicates to perform the clock supply when the process control signal indicates an execution of a processing and a content of the processing is different from a content of a previously executed processing, and indicates not to perform the clock supply when the process control signal indicates an execution of a processing and a content of the processing is same as a content of a previously executed processing, and when the process control signal does not indicate an execution of a processing.

Moreover, according to still another aspect of the present invention, there is provided a clock control method for a semiconductor integrated circuit device. The semiconductor integrated circuit device includes a plurality of operation units connected in a pipeline structure, each performing an operation processing on data, a process control unit that operates in synchronization with a system clock signal and generates a process control signal for controlling the operation units upon receiving a data notification signal that notifies an arrival of data from outside, and a clock-control signal generating unit that operates in synchronization with the system clock signal and generates a clock control signal for controlling a clock supply to each of the operation units upon receiving the process control signal. Each of the operation units includes a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal. The clock control method includes outputting including the clock control unit outputting a first clock control signal and outputting including the clock control unit outputting a second clock control signal. The first clock control signal indicates to perform the clock supply when the process control signal indicates an execution of a processing and a content different from a content of preceding executed processing, and when the process control signal indicates an execution of a processing, a content of the processing is same as a content of a previously executed processing, and a value of the data is different form a value of data processed in the previously executed processing, and indicates not to perform the clock supply when the process control signal indicates an execution of a processing, a same content as a content of a previously executed processing, and a value of the data is equal to a value of data processed in the previously executed processing, and when the process control signal does not indicate an execution of a processing. The second clock control signal indicates to perform the clock supply when the process control signal indicates an execution of a processing and a content of the processing is different from a content of a previously executed processing, and indicates not to perform the clock supply when the process control signal indicates an execution of a processing and a content of the processing is same as a content of a previously executed processing, and when the process control signal does not indicate an execution of a processing.

BRIEF DESCRIPTION OF THE DRAWINGS

FIG. 16 is a schematic diagram of a configuration of a clock-control signal generating unit shown in FIG. 15; and FIG. 17 is a schematic diagram that depicts relation between input (the content of a process control signal) and output (the clock control signal S1 and the clock control signal S2) of the clock-control signal generating unit.

DETAILED DESCRIPTION OF THE INVENTION

Exemplary embodiments of a semiconductor integrated circuit device and a clock control method for the semiconductor integrated circuit device according to the present invention will be explained below in detail with reference to the accompanying drawings.

Figure 1:
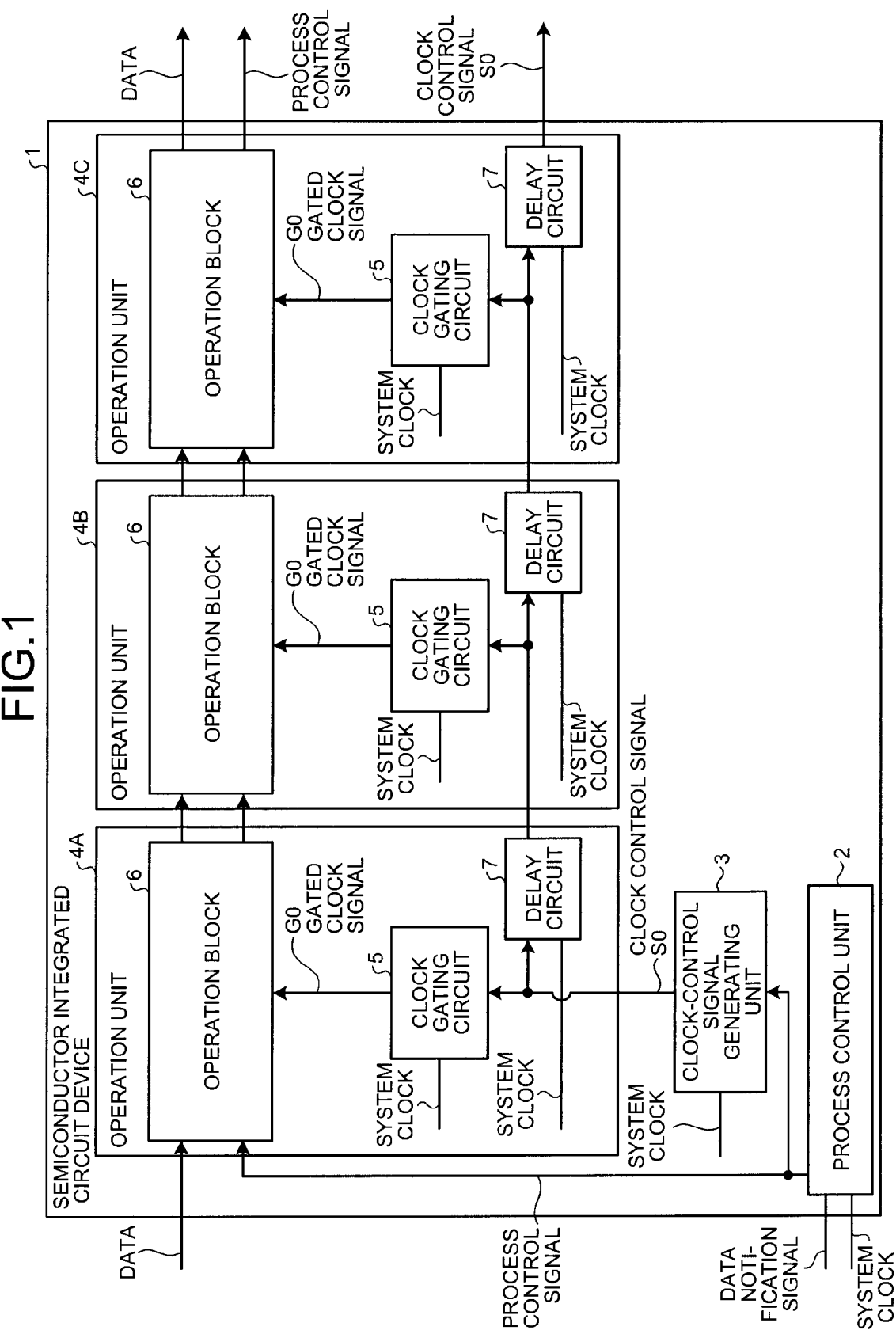
FIG. 1 is a functional block diagram of a configuration of a semiconductor integrated circuit device according to a first embodiment of the present invention.

As shown in FIG. 1, a semiconductor integrated circuit device 1 according to a first embodiment of the present invention executes operation processing on input data in accordance with a preliminarily input computer program, and outputs a result of the operation processing. A system clock, data to be actually processed, and a data notification signal that notifies the semiconductor integrated circuit device 1 of an arrival (input) of the data are input to the semiconductor integrated circuit device 1, and processed data (operation result), a process control signal, which will be described later, and a clock control signal S0, which will described later, are output from the semiconductor integrated circuit device 1. The semiconductor integrated circuit device 1 includes a process control unit 2, a clock-control signal generating unit 3, and operation units 4 (4A, 4B, and 4C).

The process control unit 2 operates synchronously with the system clock, and when a data notification signal is enabled, the process control unit 2 generates and outputs a process control signal for controlling the operation units 4 (4A, 4B, and 4C) in accordance with the preliminarily input computer program. The system clock is a clock that is generated, for example, by a not-shown Phase-Locked Loop (PLL), and constantly supplied from the outside. The system clock can be hierarchically clock-gated outside the process control unit 2, and in such case, the whole of a clock tree inside the process control unit 2 is turned inactive, so that a further reduction in power consumption can be achieved. The process control signal will be explained later in detail.

The clock-control signal generating unit 3 operates synchronously with the system clock, determines the content of the process control signal output by the process control unit 2, and controls clock supply to the operation units 4 (4A, 4B, and 4C). More specifically, the clock-control signal generating unit 3 generates the clock control signal S0 for controlling a clock gating circuit 5, which will be described later, included in the operation units 4 (4A, 4B, and 4C), and outputs the clock control signal S0 to the operation unit 4A. If the process control signal indicates to execute processing, the clock-control signal generating unit 3 generates the clock control signal S0 to provide clock supply, indicating that it is enabled; by contrast, if the process control signal indicates not to execute processing, the clock-control signal generating unit 3 generates the clock control signal S0 not to provide clock supply, indicating that it is disabled. The clock-control signal generating unit 3 will be explained later in detail.

The operation units 4 (4A, 4B, and 4C) perform the operation processing on data. The operation units 4 (4A, 4B, and 4C) are connected via the pipeline in the order named, and capable to operate in parallel with one another, so that data, the process control signal, and the clock control signal S0 are synchronously transferred on the pipeline. Although according to the first embodiment, the three of the operation units 4A, 4B, and 4C are connected via the pipeline, the number of operation units included in the semiconductor integrated circuit device can be an arbitrary number of one or more units. The operation units 4A, 4B, and 4C have the same configuration and the same functions, therefore, components of each of the operation units 4 are explained below by using the same reference numerals.

Figure 2:
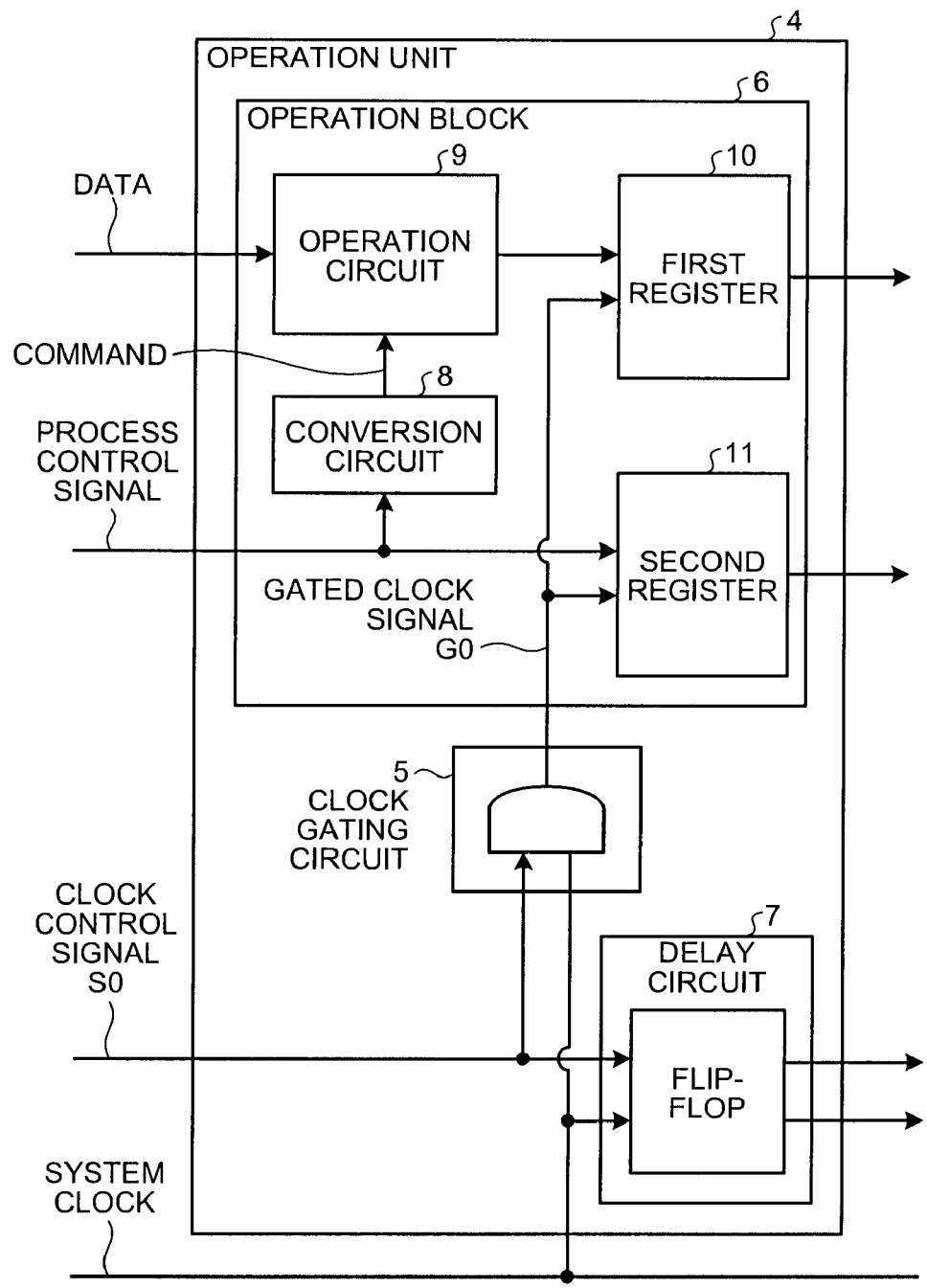
FIG. 2 is a functional block diagram of a detailed configuration of an operation unit shown in FIG. 1.

As shown in FIG. 2, the operation unit 4 includes the clock gating circuit 5, an operation block 6, and a delay circuit 7.

The clock gating circuit 5 operates synchronously with the system clock, if the clock control signal S0 is enabled, the clock gating circuit 5 generates and outputs a gated clock signal G0; by contrast, if the clock control signal S0 is disabled, the clock gating circuit 5 does not generates the gated clock signal G0, and outputs nothing. The gated clock signal G0 is a signal to operate the operation block 6, more specifically, a signal for determining storage of a processing result of an operation circuit 9, which will be described later, and storage of the process control signal. The clock gating circuit 5 can be implemented, for example, by an AND gate that receives input of the system clock and the clock control signal S0, and its structure is not particularly limited as long as the clock gating circuit 5 satisfies the above requirements.

The operation block 6 operates synchronously with the gated clock signal G0, executes processing on input data in accordance with the process control signal, and outputs processed data and the process control signal. The operation block 6 includes a conversion circuit 8, the operation circuit 9, a first register 10, and a second register 11. The conversion circuit 8 converts the process control signal into a preassigned command. Conversion from the process control signal to a command is controlled by a preliminarily input computer program. The conversion circuit 8 will be explained later in detail. The operation circuit 9 processes data in accordance with a command, and can be, for example, an arithmetic and logical unit (ALU) of a processor. The first register 10 operates synchronously with the gated clock signal G0, and stores therein data of a processing result. The second register 11 operates synchronously with the gated clock signal G0, and stores therein the process control signal.

The delay circuit 7 operates synchronously with the system clock, and delays output of the clock control signal S0 from the operation unit 4 until the operation unit 4 outputs data (operation result) processed by the operation circuit 9 and the process control signal. Precisely, the delay circuit 7 delays and outputs the clock control signal S0 to be at the same cycle as that of output of processed data (operation result) and the process control signal, in other words, the delay circuit 7 outputs the clock control signal S0 to be synchronous with processed data (operation result) and the process control signal.

According to the first embodiment, when the operation units 4 (4A, 4B, and 4C) receive input of data and the process control signal, processed data and the process control signal are output in one cycle synchronously with the gated clock signal G0. In such case, the delay circuit 7 outputs the clock control signal S0 synchronously with the system clock by delaying the clock control signal S0 for one cycle. As shown in the figure, the delay circuit 7 includes one flip-flop that operates synchronously with the system clock.

The processing by the operation unit can take two cycles or more as long as a time from when the operation unit receives input of data and the process control signal until the operation unit outputs an operation result is constant regardless of the content of the process control signal. In such case, the delay circuit 7 needs to delay the amount of time between input and output of the clock control signal S0 for the same number of cycles. For example, when a delay generated by the operation unit 4 is two cycles, two flip-flops are required. A configuration of the delay circuit 7 is not limited to that shown in the figure as long as the delay circuit 7 can generate a certain time delay.

Figure 3:
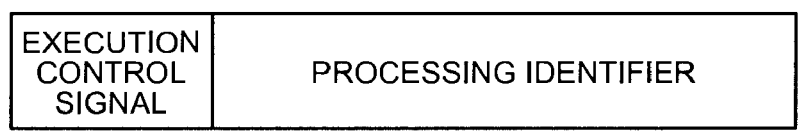
FIG. 3 is a schematic diagram of a configuration of a process control signal according to the first embodiment.

A process control signal generated and output by the process control unit 2 is explained below in detail. As described above, a process control signal controls the operation units 4 (4A, 4B, and 4C). As shown in FIG. 3, a process control signal includes an execution control signal that indicates whether processing is to be executed, and a processing identifier that identifies processing to be performed by the operation units 4 (4A, 4B, and 4C). If the execution control signal indicates execution of processing, i.e., the execution signal is enabled, the operation units 4 (4A, 4B, and 4C) perform the processing identified by the processing identifier. By contrast, if the execution control signal does not indicates execution of processing, i.e., the execution signal is disabled, the operation units 4 (4A, 4B, and 4C) do not perform any processing regardless of the processing identifier.

Usually, a processing identifier can be made of a substantially few number of bits compared with a command to be input into the operation circuit 9. For example, a 16-bit processor generates a 16-bit command, however, if only 64 kinds of commands are to be used, 6 bits are adequate for generating a command identifier. Accordingly, a storage capacity of the second register 11 of the operation units 4 (4A, 4B, and 4C) can be reduced, and the configuration of the clock-control signal generating unit 3 can be simplified, so that power consumption consumed by the semiconductor integrated circuit device 1 can be reduced.

The configuration of a process control signal is not limited to the above configuration as long as the process control signal is a signal that identifies processing to be performed by the operation units 4 (4A, 4B, and 4C). For example, a process control signal can be configured not to include an execution control signal, and to include No Operation (NOP) in part of a processing identifier instead. Alternatively, a process control signal can be configured not to include a processing identifier, and to use a command that can be directly executed by the operation circuit 9. In such case, although the conversion circuit 8 is not needed in the operation block 6, flexibility of processing is relatively little because the operation circuit 9 is to execute the same command. Furthermore, similarly to a Very Long Instruction Word (VLIW) processor, a process control signal can include a plurality of commands different to the operation blocks 6 of each of the operation units from the others, or a plurality of processing identifiers different to the operation blocks 6 of each of the operation units from the others.

Figure 4:
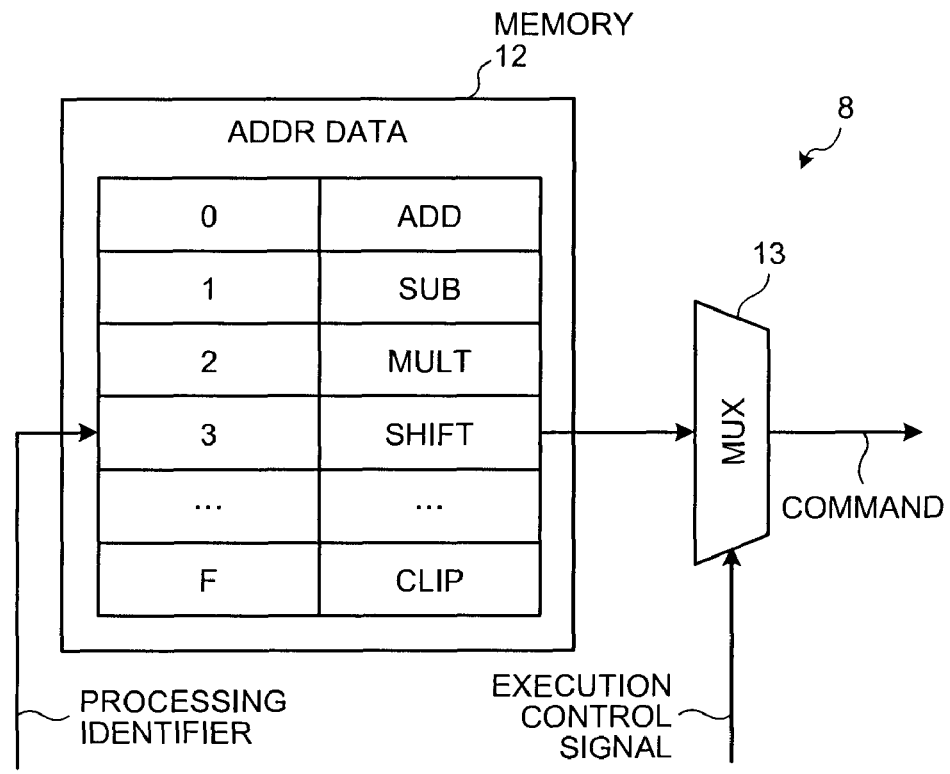
FIG. 4 is a schematic diagram of an example of a configuration of a conversion circuit shown in FIG. 2.

The conversion circuit 8 is explained below in detail. As described above, the conversion circuit 8 includes a function of converting a process control signal into a specific command. As shown in FIG. 4, the conversion circuit 8 includes a memory 12 and a multiplexer (MUX) 13. The conversion circuit 8 uniquely assigns a command to a processing identifier by storing the command into each address of the memory 12 and setting the processing identifier as a pointer. The MUX 13 then receives input of the command corresponding to the processing identifier and an execution control signal, and if the execution control signal is enabled, the MUX 13 chooses the command, by contrast, if the execution control signal is disabled, the MUX 13 chooses NOP.

Figure 5:
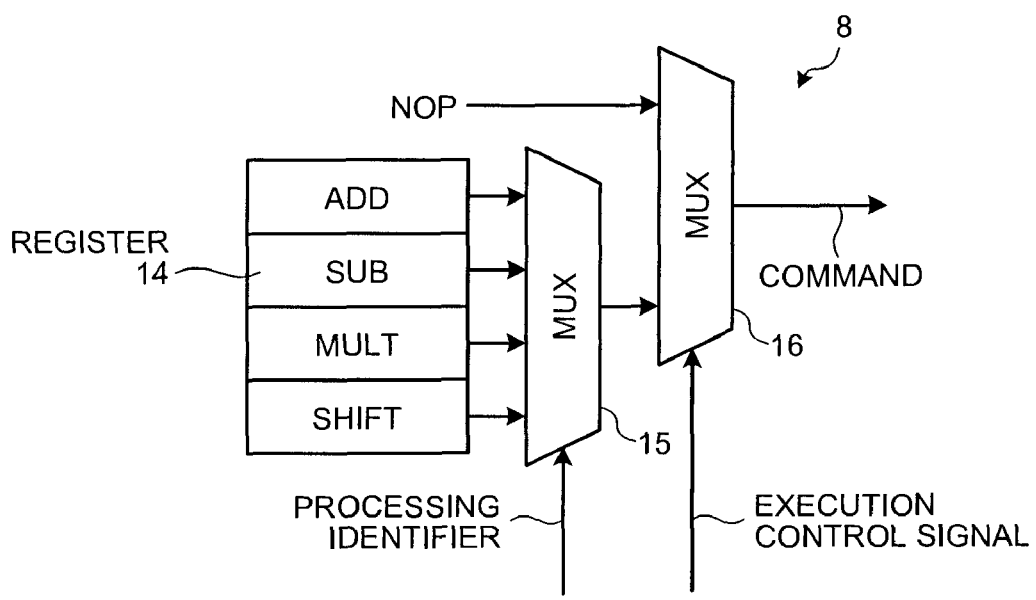
FIG. 5 is a schematic diagram of another example of a configuration of a conversion circuit shown in FIG. 2.

As shown in FIG. 5, the conversion circuit 8 includes a register 14, a first MUX 15, and a second MUX 16. The conversion circuit 8 uniquely assigns a command to a processing identifier by storing the command into the register 14 and setting the processing identifier as a selected signal of the first MUX 15. For this reason, the register 14 includes one or more registers in which a command is to be stored. The second MUX 16 then receives input of the command corresponding to the processing identifier and an execution control signal, and if the execution control signal is enabled, the second MUX 16 chooses the command, by contrast, if the execution control signal is disabled, the second MUX 16 chooses NOP. A configuration of the conversion circuit 8 is not limited to that shown in FIGS. 4 and 5 as long as the conversion circuit 8 has a function of converting a process control signal into a unique command.

Figures 6, 7:
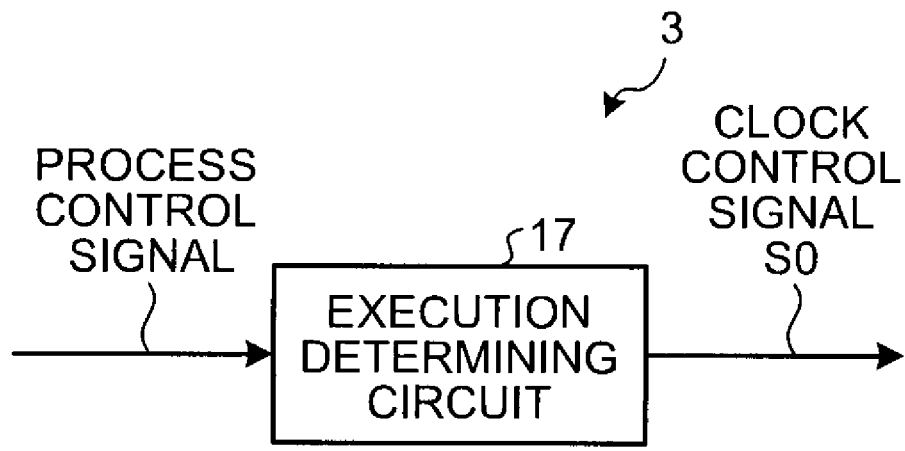
FIG. 6 is a schematic diagram of a configuration of a clock-control signal generating unit shown in FIG. 1.
FIG. 7 is a schematic diagram that depicts relation between input (the content of a process control signal) and output (a clock control signal S0) of the clock-control signal generating unit.

The clock-control signal generating unit 3 is explained below in detail. As described above, the clock-control signal generating unit 3 determines the content of a process control signal, generates the clock control signal S0 for controlling the clock gating circuit 5, and output the clock control signal S0 to the operation unit 4A. As shown in FIG. 6, the clock-control signal generating unit 3 includes an execution determining circuit 17.

The execution determining circuit 17 determines the content of the process control signal whether the process control signal is to be decoded and processing is to be executed. For example, if the process control signal includes an execution control signal, the execution determining circuit 17 determines whether the execution control signal is enabled or disabled. FIG. 7 is a schematic diagram that depicts relation between input (the content of the process control signal) and output (the clock control signal S0) of the clock-control signal generating unit 3. Configurations of the execution determining circuit 17 vary depending on a configuration of the process control signal, and are not particularly limited as long as the execution determining circuit 17 has a function of determining whether the content of the process control signal indicates to execute processing.

How the semiconductor integrated circuit device 1 executes processing on input data and outputs an operation result is specifically explained below.

When data and a data notification signal are input to the semiconductor integrated circuit device 1, the process control unit 2 operates synchronously with the system clock, generates a process control signal in accordance with a preliminarily input computer program, and outputs the generated process control signal to the clock-control signal generating unit 3 and the operation unit 4A.

The clock-control signal generating unit 3 operates synchronously with the system clock, generates the clock control signal S0 upon receiving input of the process control signal, and then outputs the clock control signal S0 to the operation unit 4A.

When receiving input of the data, the process control signal, and the clock control signal S0, the operation unit 4A starts processing on the data.

The clock gating circuit 5 of the operation unit 4A operates synchronously with the system clock, generates the gated clock signal G0 if the clock control signal S0 indicates that it is enabled, and then outputs the gated clock signal G0 to the operation block 6. By contrast, if the clock control signal S0 indicates that it is disabled, the clock gating circuit 5 does not generate the gated clock signal G0, and outputs nothing to the operation block 6.

When receiving input of the gated clock signal G0, the operation block 6 of the operation unit 4A operates synchronously with the gated clock signal G0. The conversion circuit 8 converts a processing identifier in the process control signal into a specific command. The operation circuit 9 processes the data in accordance with the converted command. The first register 10 operates synchronously with the gated clock signal G0, and stores therein data of a processing result. The second register 11 operates synchronously with the gated clock signal G0, and stores therein the process control signal. The operation block 6 then outputs the processed data and the process control signal.

The delay circuit 7 of the operation unit 4A operates synchronously with the system clock, and outputs the clock control signal S0 in a delayed manner. Consequently, the operation unit 4A outputs the processed data, the process control signal, and the clock control signal S0 with the same timing (synchronously).

The processed data, the process control signal, and the clock control signal S0 output from the operation unit 4A are input into the operation unit 4B with the same timing. The operation unit 4B performs processing similar to that performed by the operation unit 4A, and outputs processed data, the process control signal, and the clock control signal S0 with the same timing.

The processed data, the process control signal, and the clock control signal S0 output from the operation unit 4B are input into the operation unit 4C with the same timing. The operation unit 4C performs processing similar to that performed by the operation unit 4B, and outputs processed data, the process control signal, and the clock control signal S0 with the same timing.

In this way, the processed data (operation result), the process control signal, and the clock control signal S0 are output from the semiconductor integrated circuit device 1, so that the processing performed by the semiconductor integrated circuit device 1 is terminated.

During the processing performed by the operation unit 4A, if the clock gating circuit 5 does not generate the gated clock signal G0, consequently, the gated clock signal G0 is not input into the operation block 6, the first register 10 cannot store therein data of a processing result, and the second register 11 cannot store therein the process control signal, so that the operation unit 4A outputs only the clock control signal S0. After that, only the clock control signal S0 passes through the operation unit 4A, the operation unit 4B, and the operation unit 4C, and then is output from the semiconductor integrated circuit device 1.

In other words, when data input into the semiconductor integrated circuit device 1 does not need to be processed, the process control signal indicates that processing is not to be executed, and the clock control signal S0 indicates that it is disabled, consequently, the gated clock signal G0 is not generated, the operation unit 4 does not perform data processing, so that the semiconductor integrated circuit device 1 does not output operation result.

In this way, according to the semiconductor integrated circuit device of the first embodiment, clock supply to each of the operation units can be separately only by inputting a clock control signal generated by the clock-control signal generating unit from a process control signal generated by the process control unit only into the first operation unit among the operation units included in the pipeline, so that a simple structure that includes one clock-control signal generating unit can control all of a plurality of operation units, thereby reducing power consumption.

Furthermore, according to the semiconductor integrated circuit device of the first embodiment, when receiving input of data that does not require operation processing, the clock-control signal generating unit outputs a clock control signal not to provide clock supply, and the clock gating circuit does not generate gated clock signal, consequently, the operation unit does not perform operation processing, so that power consumption can be reduced.

Although according to the first embodiment, the clock-control signal generating unit generates one clock control signal, a clock-control signal generating unit according to a second embodiment of the present invention generates and outputs two clock control signals. The second embodiment is explained below with reference to the accompanying drawings. With respect to a configuration of a semiconductor integrated circuit device according to the second embodiment, parts different from the first embodiment are explained below. The rest of the parts are similar to those according to the first embodiment, so that referring to the above explanations, explanations of components and items assigned with the same reference numerals or letters are omitted in the following description.

Figure 8:
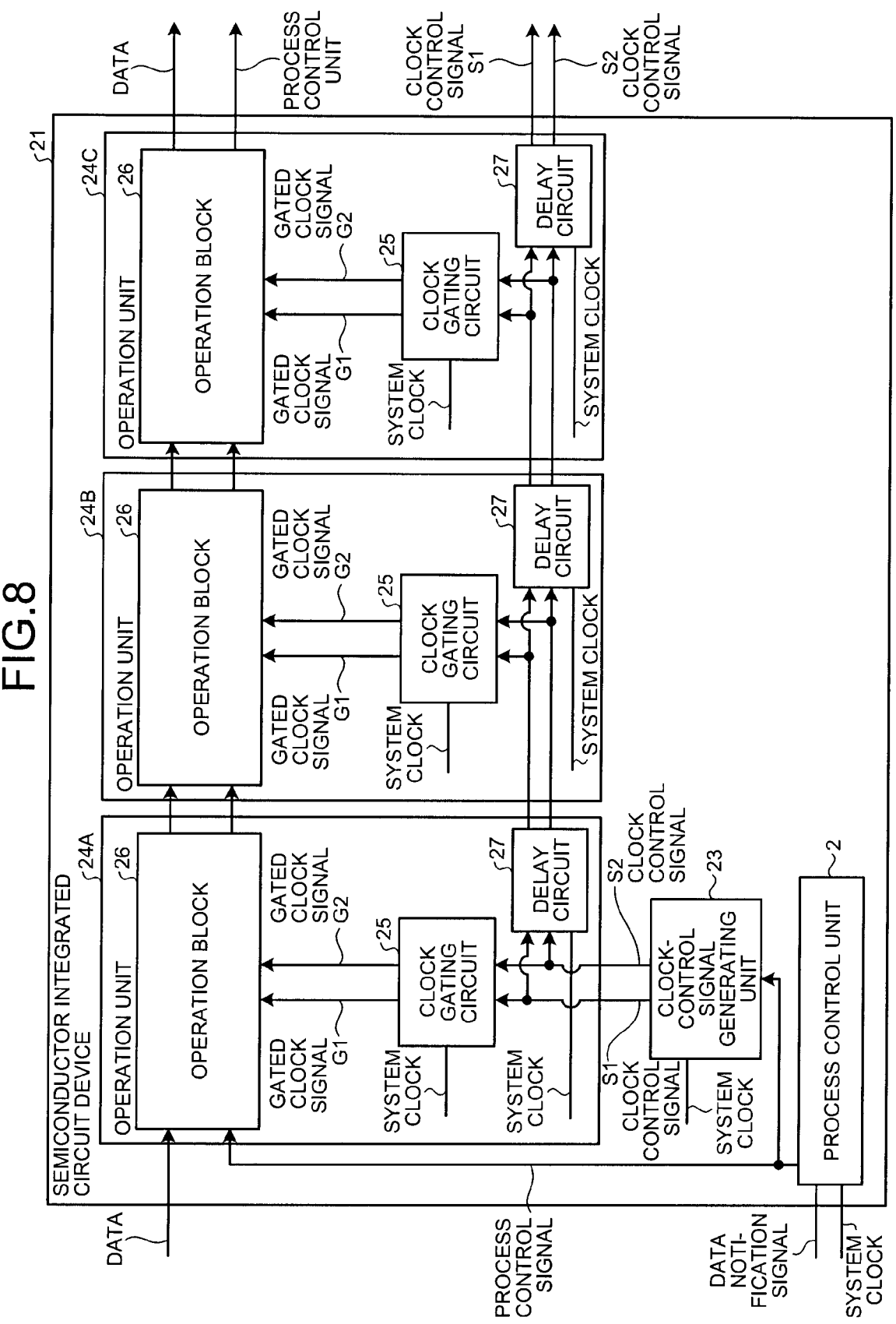
FIG. 8 is a functional block diagram of a configuration of a semiconductor integrated circuit device according to a second embodiment of the present invention.

As shown in FIG. 8, a semiconductor integrated circuit device 21 executes processing on input data in accordance with a preliminarily input computer program, and outputs an operation result. The system clock, data to be actually processed, and a data notification signal that notifies the semiconductor integrated circuit device 21 of an arrival (input) of the data are input to the semiconductor integrated circuit device 21, and processed data (operation result), a process control signal, and a clock control signal S1 and a clock control signal S2, both of which will described later, are output from the semiconductor integrated circuit device 21. The semiconductor integrated circuit device 21 includes the process control unit 2, a clock-control signal generating unit 23, and operation units 24 (24A, 24B, and 24C).

The clock-control signal generating unit 23 operates synchronously with the system clock, determines the content of a process control signal output by the process control unit 2, and controls clock supply to the operation units 24 (24A, 24B, and 24C). More specifically, the clock-control signal generating unit 23 generates the clock control signal S1 and the clock control signal S2 for controlling a clock gating circuit 25, which will be described later, included in the operation units 24 (24A, 24B, and 24C), and outputs the generated clock control signals to the operation unit 24A. When generating the clock control signals, if the process control signal indicates to execute processing, the clock-control signal generating unit 23 generates the clock control signal S1 to provide clock supply, indicating that it is enabled, regardless of the content of the processing to be executed. By contrast, if the process control signal indicates not to execute processing, the clock-control signal generating unit 23 generates the clock control signal S1 not to provide clock supply, indicating that it is disabled, regardless of the content of the processing to be executed.

Moreover, if the process control signal indicates to execute processing, and the content of the processing to be executed is different from a preceding processed content, the clock-control signal generating unit 23 generates the clock control signal S2 to provide clock supply, indicating that it is enabled. Furthermore, if the process control signal indicates to execute processing, and the content of the processing to be executed is the same content as the preceding processed content, the clock-control signal generating unit 23 generates the clock control signal S2 not to provide clock supply, indicating that it is disabled. Moreover, if the process control signal indicates not to execute processing, the clock-control signal generating unit 23 generates the clock control signal S2 not to provide clock supply, indicating that it is disabled, regardless of the content of the processing to be executed. The clock-control signal generating unit 23 will be explained later in detail.

The operation units 24 (24A, 24B, and 24C) perform operation processing on data. The operation units 24 (24A, 24B, and 24C) are connected via the pipeline in the order named, and capable to operate in parallel with one another, so that data, the process control signal, and the clock control signal S1 and the clock control signal S2 are synchronously transferred on the pipeline. Although according to the second embodiment, the three of the operation units 24A, 24B, and 24C are connected via the pipeline, the number of operation units of the semiconductor integrated circuit device can be an arbitrary number of one or more units. The operation units 24A, 24B, and 24C have the same configuration and the same functions, therefore, components of each of the operation units 24 are explained below by using the same reference numerals.

Figure 9:
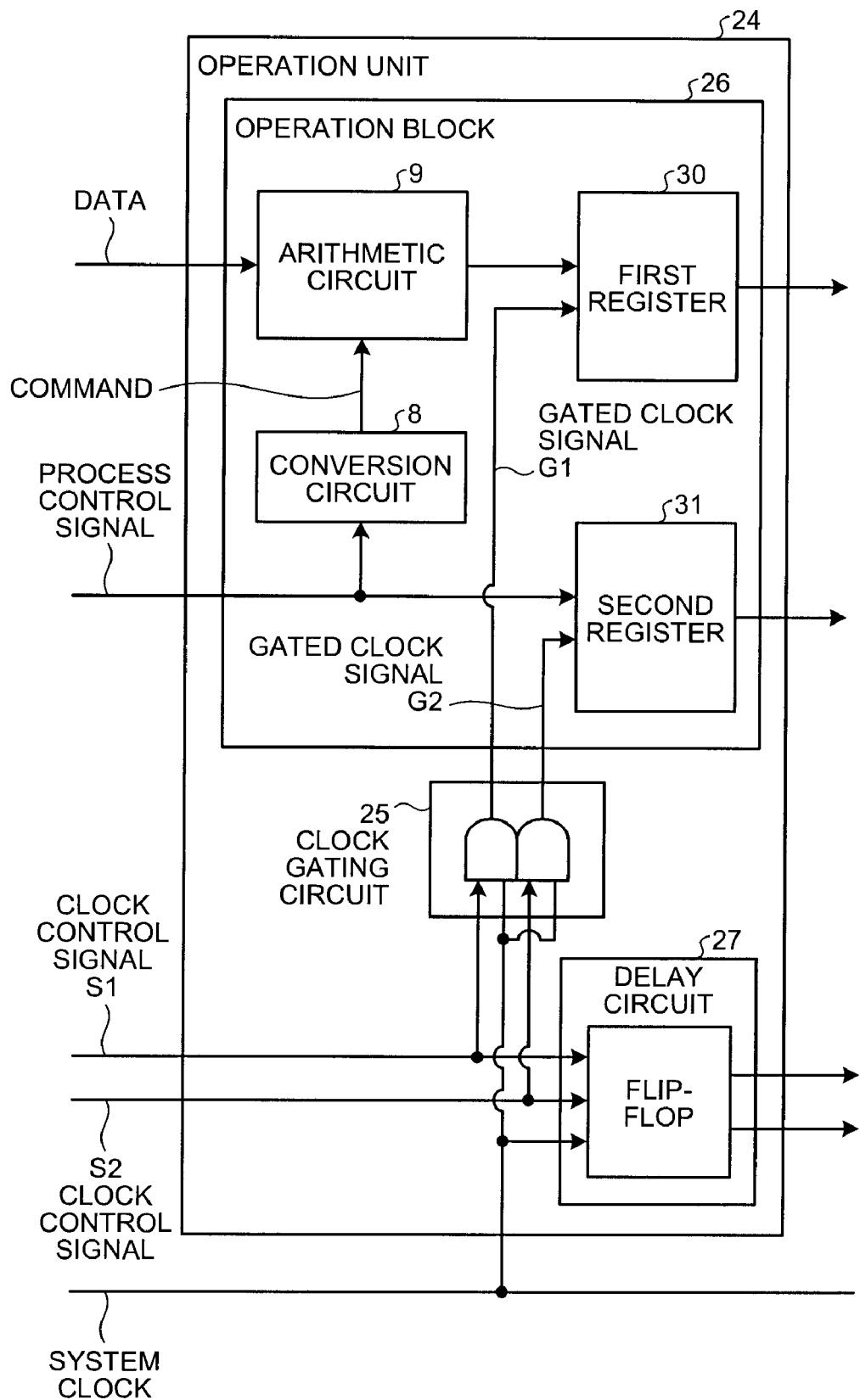
FIG. 9 is a functional block diagram of a detailed configuration of an operation unit shown in FIG. 8.

As shown in FIG. 9, the operation unit 24 includes the clock gating circuit 25, an operation block 26, and a delay circuit 27.

The clock gating circuit 25 operates synchronously with the system clock, and generates a gated clock signal G1 and a gated clock signal G2 from the clock control signal S1 and the clock control signal S2. Specifically, if the clock control signal S1 is enabled, the clock gating circuit 25 generates and outputs the gated clock signal G1; by contrast, if the clock control signal S1 is disabled, the clock gating circuit 25 does not generate the gated clock signal G1 and outputs nothing. The gated clock signal G1 is a signal to operate the operation block 26, more specifically, a signal for determining storage of data of a processing result of the operation circuit 9.

Furthermore, while operating synchronously with the system clock, if the clock control signal S2 is enabled, the clock gating circuit 25 generates and outputs the gated clock signal G2; by contrast, if the clock control signal S2 is disabled, the clock gating circuit 25 does not generate the gated clock signal G2 and outputs nothing. The gated clock signal G2 is a signal to operate the operation block 26, more specifically, a signal for determining that the process control signal is to be stored. The clock gating circuit 25 can be implemented, for example, by two AND gate, namely, an AND gate that receives the system clock and the clock control signal S1 and an AND gate that receives the system clock signal and the clock control signal S2, and its structure is not particularly limited as long as the clock gating circuit 25 satisfies the above requirements.

The operation block 26 operates synchronously with the gated clock signal G1, executes processing on input data in accordance with the process control signal, and outputs processed data and the process control signal. The operation block 26 includes the conversion circuit 8, the operation circuit 9, a first register 30, and a second register 31. The conversion circuit 8 includes the memory 12 and the MUX 13. The first register 30 operates synchronously with the gated clock signal G1, and stores therein data of a processing result. The second register 31 operates synchronously with the gated clock signal G2, and stores therein the process control signal.

The delay circuit 27 operates synchronously with the system clock, and delays output of the clock control signal S1 and the clock control signal S2 from the operation unit 24 until the operation unit 24 outputs data (operation result) processed by the operation circuit 9 and the process control signal. Precisely, the delay circuit 27 delays and outputs the clock control signal S1 and the clock control signal S2 to be at the same cycle as that of output of processed data (operation result) and the process control signal, in other words, the delay circuit 27 outputs the clock control signal S1 and the clock control signal S2 to be synchronous with processed data (operation result) and the process control signal.

According to the first embodiment, when the operation units 24 (24A, 24B, and 24C) receive input of data and the process control signal, processed data and the process control signal are output in one cycle synchronously with the gated clock signal G1 and the gated clock signal G2. In such case, the delay circuit 27 outputs the clock control signal S1 and the clock control signal S2 synchronously with the system clock by delaying the clock control signals for one cycle. As shown in the figure, the delay circuit 27 includes one flip-flop that operates synchronously with the system clock.

Figures 10, 11:
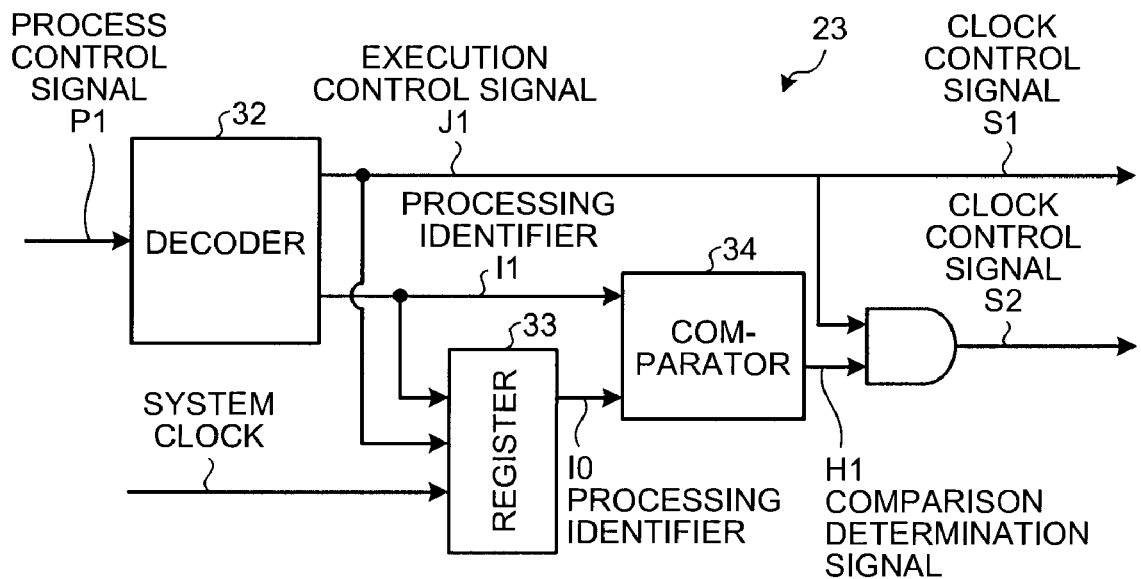
FIG. 10 is a schematic diagram of a configuration of a clock-control signal generating unit shown in FIG. 8.
FIG. 11 is a schematic diagram that depicts relation between input (the content of a process control signal) and output (a clock control signal S1 and a clock control signal S2) of the clock-control signal generating unit.

The clock-control signal generating unit 23 is explained below in detail. As described above, the clock-control signal generating unit 23 determines the content of a process control signal, generates the clock control signal S1 and the clock control signal S2 for controlling the clock gating circuit 25, and outputs the generated clock control signals to the operation unit 24A. As shown in FIG. 10, the clock-control signal generating unit 23 includes a decoder 32, a register 33, and a comparator 34. The decoder 32 extracts an execution control signal J1 and a processing identifier I1 from a process control signal P1. The register 33 operates synchronously the system clock, and stores therein the processing identifier I1 if the execution control signal J1 is enabled. The register 33 is a register with a write enable signal.

If the value of the processing identifier I1 extracted by the decoder 32 is different from the value of a processing identifier I0 output from the register 33, the comparator 34 outputs a comparison determination signal Hi as it is enabled, by contrast, if the value of the processing identifier I1 is equal to the value of the processing identifier I0, the comparison determination signal H1 is output as it is disabled. The processing identifier I0 is a processing identifier of a process control signal P0 that is input into the clock-control signal generating unit 23 before the process control signal P1 and of which an execution control signal J0 is enabled. Precisely, the processing identifier I0 is a processing identifier stored immediately before the processing identifier I1 is stored into the register 33.

If the execution control signal J1 extracted by the decoder 32 is enabled, the clock control signal S1 indicates that it is enabled, and by contrast, if the execution control signal J1 is disabled, the clock control signal S1 indicates that it is disabled. The clock control signal S2 indicates a result of a logical product of the comparison determination signal H1 and the execution control signal J1.

The preceding processed content described in FIG. 11 mean the preceding processing executed by the semiconductor integrated circuit device 21, i.e., processing specified by the processing identifier of the process control signal at the latest time when the execution control signal of the process control signal is enabled.

For example, if the execution control signal of the process control signal input into the clock-control signal generating unit 23 is disabled in the preceding two cycles, and the execution control signal of the process control signal is enabled in the further previous cycle (three cycles ago), the processing identifier I1 stored in the register 33 is the processing identifier of the process control signal input three cycles ago.

If the content of the input process control signal indicates processing execution, and the concrete processing content is different from the preceding executed processing, the clock-control signal generating unit 23 outputs the clock control signal S1 and the clock control signal S2 as the both of them are enabled. Moreover, if the content of the input process control signal indicate processing execution, and the concrete processing content is the same content as that of the preceding executed processing, the clock-control signal generating unit 23 outputs the clock control signal S1 as it is enabled, and the clock control signal S2 as it is disabled. Furthermore, if the content of the input process control signal indicates inexecution of processing, the clock-control signal generating unit 23 outputs the clock control signal S1 and the clock control signal S2 as the both of them are disabled, regardless of the content of the processing to be executed.

How the semiconductor integrated circuit device 21 executes processing on input data and outputs an operation result is specifically explained below.

When data and a data notification signal are input to the semiconductor integrated circuit device 21, the process control unit 2 operates synchronously with the system clock, generates a process control signal in accordance with a preliminarily input computer program, and outputs the generated process control signal to the clock-control signal generating unit 23 and the operation unit 24A.

The clock-control signal generating unit 23 operates synchronously with the system clock, generates the clock control signal S1 and the clock control signal S2 upon receiving input of the process control signal, and then outputs the generated clock control signals to the operation unit 4A.

When receiving input of the data, the process control signal, and the clock control signal S1 and the clock control signal S2, the operation unit 24A starts processing on the data.

The clock gating circuit 25 of the operation unit 24A operates synchronously with the system clock, generates the gated clock signal G1 if the clock control signal S1 indicates that it is enabled, and then outputs the gated clock signal G1 to the operation block 26. By contrast, if the clock control signal S1 indicates that it is disabled, the clock gating circuit 25 does not generate the gated clock signal G1, and outputs nothing to the operation block 26.

Furthermore, the clock gating circuit 25 of the operation unit 24A operates synchronously the system clock, generates the gated clock signal G2 if the clock control signal S2 indicates that it is enabled, and then outputs the gated clock signal G2 to the operation block 26. By contrast, if the clock control signal S2 indicates that it is disabled, the clock gating circuit 25 does not generate the gated clock signal G2, and output nothing to the operation block 26.

When receiving input of the gated clock signal G1 and the gated clock signal G2, the operation block 26 of the operation unit 24A operates synchronously with the gated clock signal G1 and the gated clock signal G2.

The conversion circuit 8 converts a processing identifier in the process control signal into a specific command. The operation circuit 9 processes the data in accordance with the converted command. The first register 30 operates synchronously with the gated clock signal G1, and stores therein data of a processing result. The second register 31 operates synchronously with the gated clock signal G2, and stores therein the process control signal. The operation block 26 then outputs the processed data and the process control signal.

If the clock gating circuit 25 does not generates the gated clock signal G2, consequently, the gated clock signal G2 is not input into the operation block 26, the second register 31 does not operate, and the process control signal previously stored in the second register 31 remains being stored as it is. In other words, because the newly input process control signal is the same process control signal as the one that is previously stored in the second register 31, the operation unit 24A performs data processing based on the newly input process control signal, and subsequently, the operation units 24B and 24C perform data processing based on the previously stored process control signal. As the second register 31 of the operation unit 24B and the second register 31 of the operation unit 24C do not operate, a power consumption consumed by the semiconductor integrated circuit device can be reduced.

The delay circuit 27 of the operation unit 24A operates synchronously with the system clock, and outputs the clock control signal S1 and the clock control signal S2 in a delayed manner. Consequently, the operation unit 24A outputs the processed data, the process control signal, and the clock control signal S1 and the clock control signal S2 with the same timing (synchronously).

The processed data, the process control signal, and the clock control signal S1 and the clock control signal S2 output from the operation unit 24A are input into the operation unit 24B with the same timing. The operation unit 24B performs processing similar to that performed by the operation unit 24A, and outputs processed data, the process control signal, and the clock control signal S1 and the clock control signal S2 with the same timing.

The processed data, the process control signal, and the clock control signal S1 and the clock control signal S2 output from the operation unit 24B are input into the operation unit 24C with the same timing. The operation unit 24C performs processing similar to that performed by the operation unit 24B, and outputs processed data, the process control signal, and the clock control signal S1 and the clock control signal S2 with the same timing.

In this way, the processed data (operation result), the process control signal, and the clock control signal S1 and the clock control signal S2 are output from the semiconductor integrated circuit device 21, so that the processing performed by the semiconductor integrated circuit device 21 is terminated.

During the processing performed by the operation unit 24A, if the clock gating circuit 25 does not generate the gated clock signal G1, consequently, the gated clock signal G1 is not input into the operation block 26, the first register 30 cannot store therein data of a processing result, so that the operation unit 24A outputs only the clock control signal S1 and the clock control signal S2. After that, only the clock control signal S1 and the clock control signal S2 pass through the operation unit 24A, the operation unit 24B, and the operation unit 24C, and then is output from the semiconductor integrated circuit device 21.

In other words, when data input into the semiconductor integrated circuit device 21 does not need to be processed, the process control signal indicates that processing is not to be executed, and the clock control signal S1 indicates that it is disabled, consequently, the gated clock signal G1 is not generated, the operation unit 24 does not perform data processing, so that the semiconductor integrated circuit device 21 does not output operation result.

An example of operation processing performed by the semiconductor integrated circuit device 21 is explained below. The example is explained in a case where the operation units 24 (24A, 24B, and 24C) can execute a binary operation, and the semiconductor integrated circuit device 21 performs operation processing based on a computer program as follows:

for (i=0; i<SIZE; i=i+1)

$\{Y[i]=(R[i]+2G[i]+B[i])>>2;$ $Co[i]=(R[i]-B[i])>>1;$ $Cg[i]=(-R[i]+2G[i]-B[i])>>2;\}$

The computer program is a color conversion program (color transformation) for converting an RGB color space into a YCC color space in the H.264 encoding. The variable SIZE in the color conversion program denotes the number of pixels to be processed. The color conversion program can be divided into only binary operations as follows:

for (i=0; i<SIZE; i=i+1)

| | |
|---|---|
| $L[i]=R[i]+B[i];$ | {Expression (1) |
| $M[i]=R[i]-B[i];$ | Expression (2) |
| $Co[i]=M[i]>>1;$ | Expression (3) |
| $N[i]=G[i]<<1;$ | Expression (4) |
| $O[i]=N[i]+L[i];$ | Expression (5) |
| $P[i]=N[i]-L[i];$ | Expression (6) |
| $Y[i]=O[i]>>2;$ | Expression (7) |
| $Cg[i]=P[i]>>2;\}$ | Expression (8) |

When the semiconductor integrated circuit device 21 performs operation processing in accordance with the color conversion program divided into only binary operations, for example, Expressions (1) to (8) are assigned to the operation units 24A, 24B, and 24C.

Figure 12:
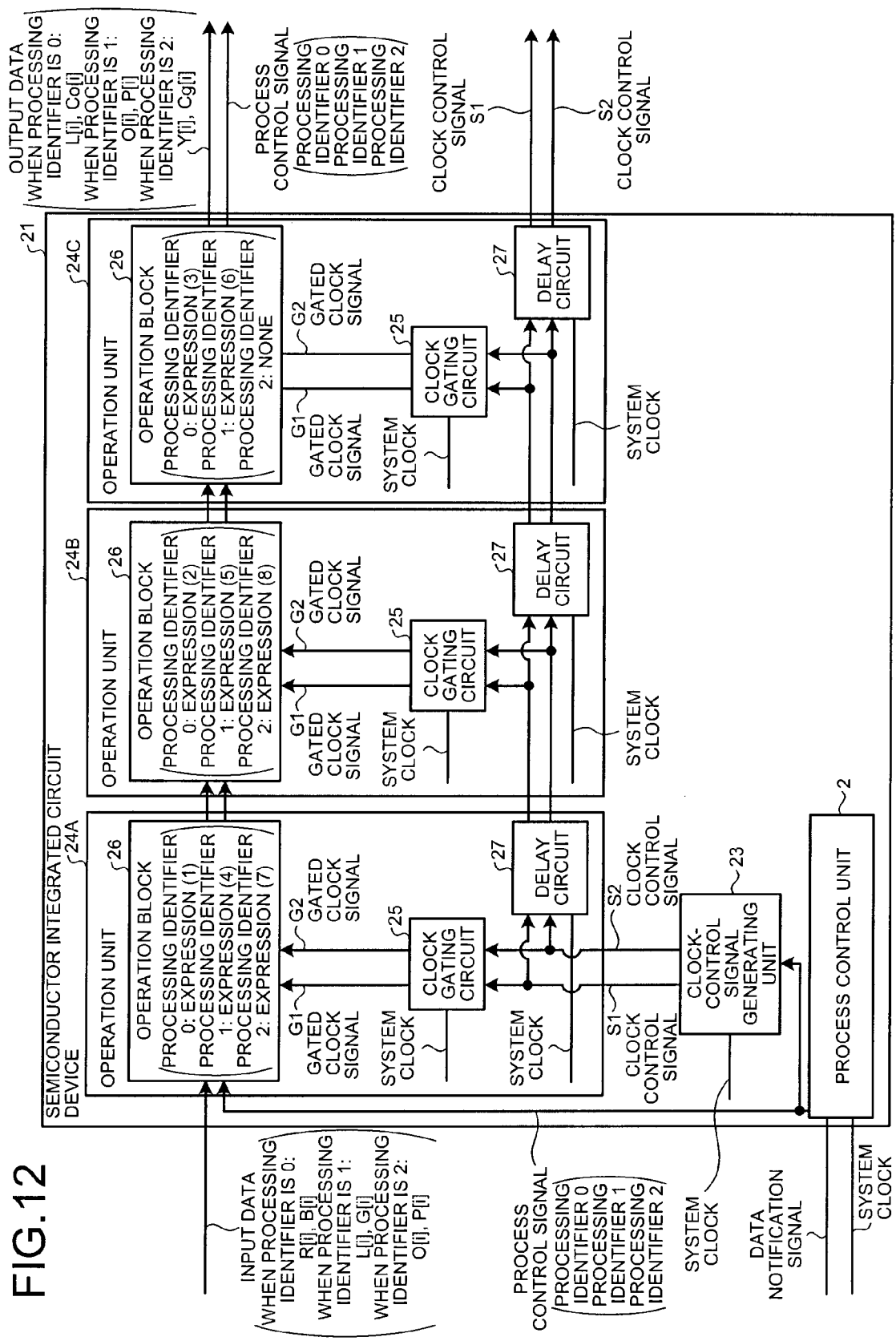
FIG. 12 is a schematic diagram of an example of processing assigned to operation units, when the semiconductor integrated circuit device shown in FIG. 8 executes a color conversion program.

In the case shown in FIG. 12, Expressions (1), (4), and (7) are stored to the address of the memory 12 of the operation unit 24A, Expressions (2), (5), and (8), are stored to the address of the memory 12 of the operation unit 24B, and Expressions (3) and (6) are stored to the address of the memory 12 of the operation unit 24C.

If the processing identifier of the process control signal is 0, the operation unit 24A performs a calculation of Expression (1); if the processing identifier of the process control signal is 1, the operation unit 24A performs a calculation of Expression (4); and if the processing identifier of the process control signal is 2, the operation unit 24A performs a calculation of Expression (7). If the processing identifier of the process control signal is 0, the operation unit 24B performs a calculation of Expression (2); if the processing identifier of the process control signal is 1, the operation unit 24B performs a calculation of Expression (5); and if the processing identifier of the process control signal is 2, the operation unit 24B performs a calculation of Expression (8). If the processing identifier of the process control signal is 0, the operation unit 24C performs a calculation of Expression (3); if the processing identifier of the process control signal is 1, the operation unit 24C performs a calculation of Expression (6); and if the processing identifier of the process control signal is 2, the operation unit 24C does not performs calculation.

At first, when R[i], B[i], and 0 as the processing identifier of the process control signal are input into the operation unit 24A, the operation unit 24A performs the calculation of Expression (1), and then outputs R[i], B[i], and a calculation result of Expression (1), L[i], to the operation unit 24B. The operation unit 24B performs the calculation of Expression (2), and then outputs L[i], and a calculation result of Expression (2), M[i]. R[i] and B[i] are not needed in Expression (3) for the operation unit 24C, therefore, can be either output or not output to the operation unit 24C. The operation unit 24C performs the calculation of Expression (3), then outputs L[i], and a calculation result of Expression (3), Co[i], as output data, and L[i] and Co[i] are stored into a not-shown storage unit.

Then, when R[i+1], B[i+1], and 0 as the processing identifier of the process control signal are input into the operation unit 24A, the operation unit 24A performs the calculation of Expression (1), and then outputs R[i+1], B[i+1], and a calculation result of Expression (1), L[i+1], to the operation unit 24B, and subsequently, similar processing is repeated.

On the other hand, when L[i], G[i], and 1 as the processing identifier of the process control signal are input into the operation unit 24A, the operation unit 24A performs the calculation of Expression (4), and then outputs L[i], and a calculation result of Expression (4), N[i], to the operation unit 24B. The operation unit 24B performs the calculation of Expression (5), and then outputs L[i], N[i], and a calculation result of Expression (5), O[i]. The operation unit 24C performs the calculation of Expression (6), then outputs O[i], and a calculation result of Expression (6), P[i], as output data, and O[i] and P[i] are stored into a not-shown storage unit.

Finally, calculated O[i] and P[i], and 2 as the processing identifier of the process control signal are input into the operation unit 24A as input data, the operation unit 24A performs the calculation of Expression (7), and then outputs P[i], and a calculation result of Expression (7), Y[i], to the operation unit 24B. The operation unit 24B then performs the calculation of Expression (8), and outputs Y[i], and a calculation result of Expression (8), Cg[i]. The operation unit 24C does not perform calculation, and outputs Y[i] and Cg[i] as they are as output data, and then Y[i] and Cg[i] are stored into a not-shown storage unit. Through the above processing, Y[i], Co[i], and Cg[i] are obtained, so that the RGB color space are converted into the YCC color space.

Figure 13:
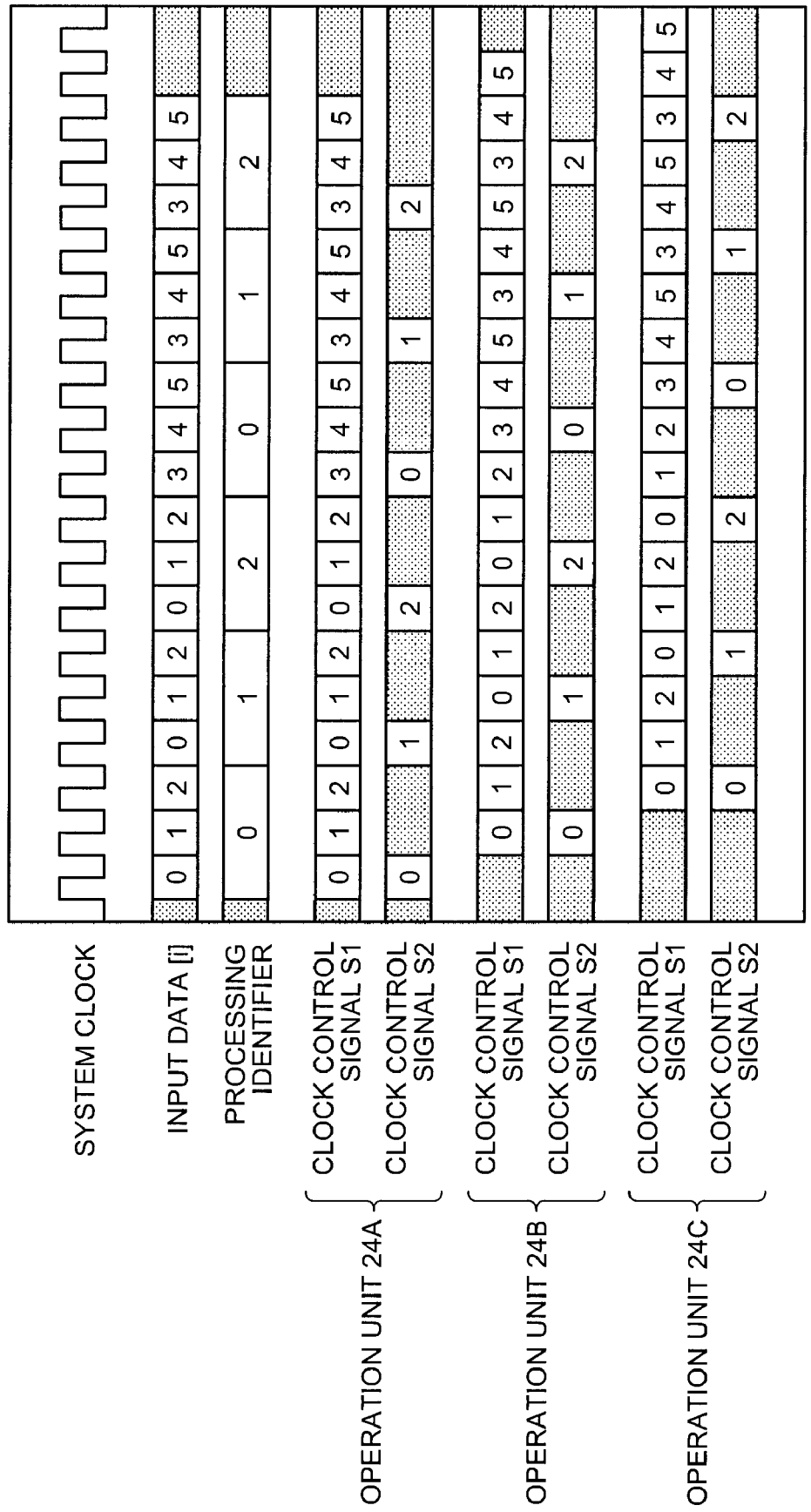
FIG. 13 is a schematic diagram of an example of a time chart when the semiconductor integrated circuit device executes the color conversion program.

According to FIG. 13, operation processing is performed on six pixels, more specifically, the operation processing is performed twice on three pixels each.

The input data [i] shown in the figure denotes data (corresponding to pixel) input from the outside, each white section indicates that input of data is enabled. A number described in each white section indicates a variable i (0 to 5) of the above computer program (input data), i.e., indicating which place in the order of the pixels the input data corresponds to.

The processing identifier in the figure denotes the processing identifier to be input into the operation unit, each white section indicates that the execution control signal is enabled. The number described in each white section indicates a value (0 to 2) of the processing identifier.

The clock control signal S1 and the clock control signal S2 of each of the operation units 24A, 24B, and 24C indicate a status of the control signal, namely, a white section indicates that the control signal is enabled, and a gray section indicates that the control signal is disabled. The number described in each white section of the clock control signal S1 denotes the variable i (0 to 5) of the above computer program (input data), and the number described in each white section of the clock control signal S2 indicates a value (0 to 2) of the processing identifier.

According to the example, the processing is performed twice by dividing six pixels into three pixels each, accordingly, after the operation processing (conversion into the YCC color space) on three consecutive pieces of data (i=0 to 2) is completed, the operation processing (conversion into the YCC color space) on the following three pieces of data (i=3 to 5) is performed. Consequently, it takes nine cycle for finishing the processing of the conversion of one pixel into the YCC color space.

The clock control signal S1 of each of the operation units 24A, 24B, and 24C is continuously enabled for 18 cycles, because data is input continuously for 18 cycles. On the other hand, the clock control signal S2 is enabled once in three cycles, because the command is changed every three cycles.

The clock control signal S1 and the clock control signal S2 are transferred through the operation units 24A, 24B, and 24C synchronously with input data and the processing identifier (process control signal) with the delay circuit 27. Accordingly, a clock can be supplied only when each operation unit executes processing by using the same process control signal.

Figure 14:
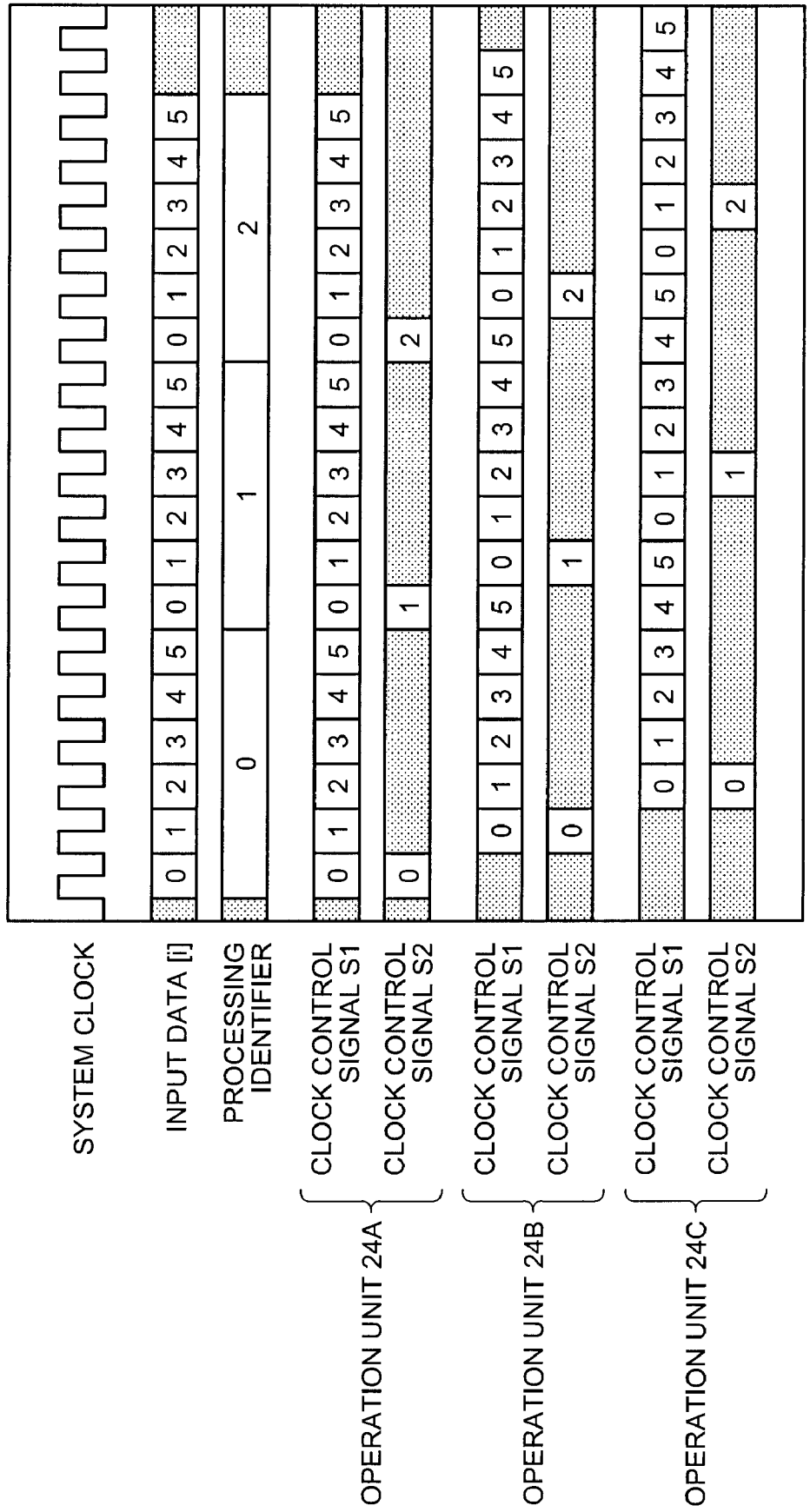
FIG. 14 is a schematic diagram of another example of a time chart when the semiconductor integrated circuit device executes the color conversion program.

According to FIG. 14, operation processing is performed on six pixels, more specifically, the operation processing is performed once on six pixels continuously.

According to the example, because the operation processing on six pixels is performed once continuously, the operation processing (conversion into the YCC color space) is continuously performed on six pieces of data (i=0 to 5). Consequently, it takes 15 cycles for finishing the processing of the conversion of one pixel into the YCC color space.

The clock control signal S1 of each of the operation units 24A, 24B, and 24C is continuously enabled for 18 cycles, because data is input continuously for 18 cycles. On the other hand, the clock control signal S2 is enabled once in six cycles, because the command is changed every six cycles.

Accordingly, compared with the case as explained in FIG. 13 where the operation processing is performed twice on three pixels each, a time for finishing the processing of the conversion of one pixel into the YCC color space, i.e., a latency for outputting a conversion result of each pixel, is increased. On the other hand, the number of times when the clock control signal S2 is enabled due to change in a command identifier is decreased, so that it is effective at reducing a power consumption consumed by the semiconductor integrated circuit device 21.

In either of the two cases when performing the operation processing twice on three pixels each and when performing the operation processing once on six pixels, there is no change in a throughput of the operation processing, therefore, a power consumption can be reduced in the processing with a small restriction of the latency by continuously performing the operation processing with the same processing identifier.

In this way, according to the semiconductor integrated circuit device of the second embodiment, when the content of requested processing is the same content as the preceding processed content, the clock-control signal generating unit outputs a clock control signal not to provide clock supply, and the clock gating circuit does not generate a gated clock signal to store a process control signal newly. Consequently, the operation unit uses the process control signal already stored in the internal register, and the register does not need to perform operation of newly storing therein the same process control signal, so that a power consumption consumed by the semiconductor integrated circuit device can be reduced.

According to the second embodiment, the clock-control signal generating unit generates a clock control signal from the content of a process control signal, and outputs the generated clock control signal. A clock-control signal generating unit according to a third embodiment of the present invention generates a clock control signal from the content of a process control signal and the content of input data, and outputs the generated clock control signal. The third embodiment according to the present invention is explained below with reference to the accompanying drawings. With respect to a configuration of a semiconductor integrated circuit device according to the third embodiment, parts different from the second embodiment are explained below. The rest of the parts are similar to those according to the second embodiment, so that referring to the above explanations, explanations of components and items assigned with the same reference numerals or letters are omitted in the following description.

Figure 15:
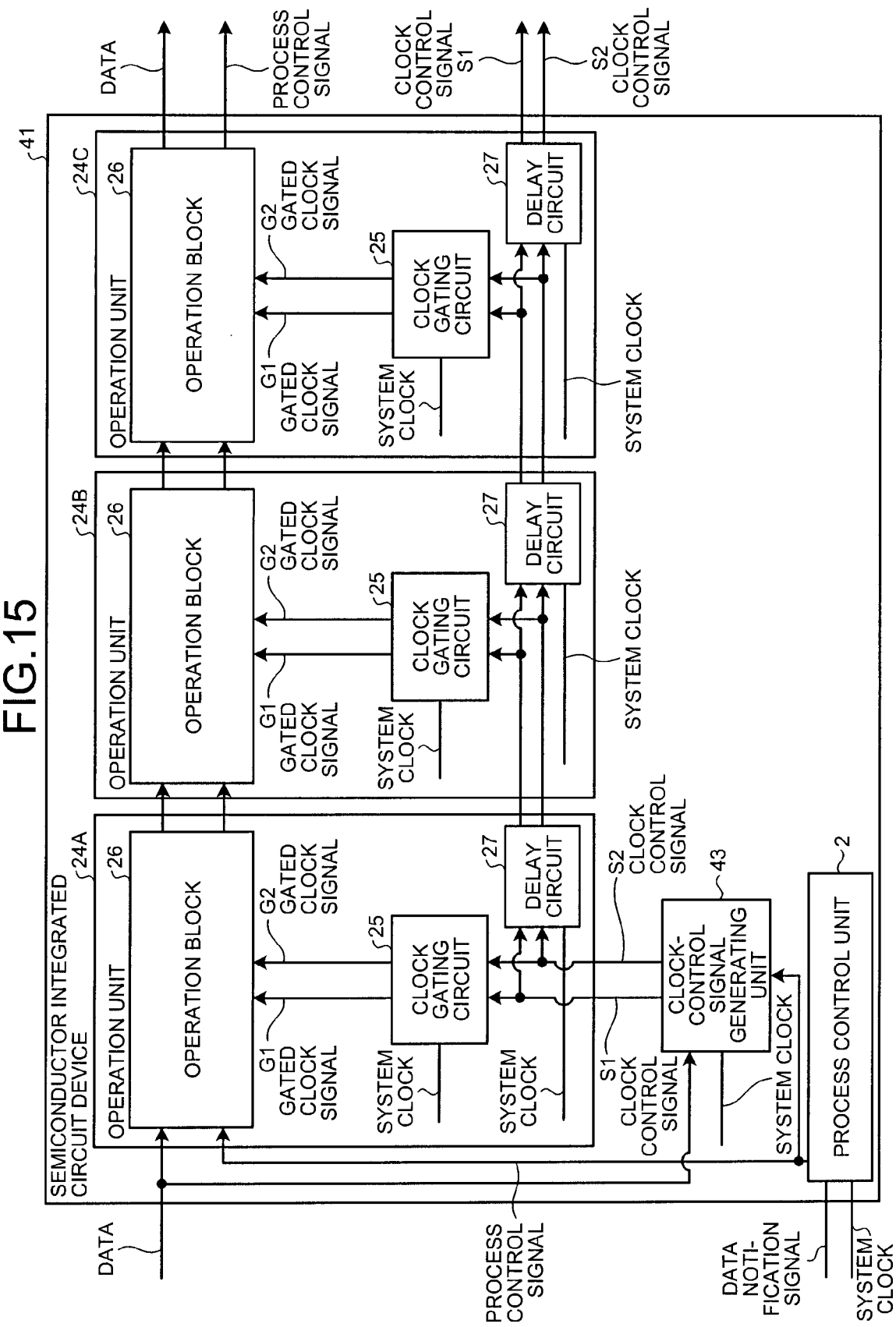
FIG. 15 is a functional block diagram of a configuration of a semiconductor integrated circuit device according to a third embodiment of the present invention.

As shown in FIG. 15, a semiconductor integrated circuit device 41 executes processing on input data in accordance with a preliminarily input computer program, and outputs an operation result. The system clock, data to be actually processed, and a data notification signal that notifies the semiconductor integrated circuit device 41 of an arrival (input) of the data are input to the semiconductor integrated circuit device 41, and processed data (operation result), a process control signal, and the clock control signal S1 and the clock control signal S2 are output from the semiconductor integrated circuit device 41. The semiconductor integrated circuit device 41 includes the process control unit 2, a clock-control signal generating unit 43, and the operation units 24 (24A, 24B, and 24C).

The clock-control signal generating unit 43 operates synchronously with the system clock, determines the content of a process control signal output by the process control unit 2, and controls clock supply to the operation units 24 (24A, 24B, and 24C). More specifically, the clock-control signal generating unit 43 generates the clock control signal S1 and the clock control signal S2 for controlling the clock gating circuit 25, which will be described later, included in the operation units 24 (24A, 24B, and 24C), and outputs the generated clock control signals to the operation unit 24A.

When generating the clock control signals, if the process control signal indicates to execute processing, and the content of the processing to be executed is different from a preceding processed content, the clock-control signal generating unit 43 generates the clock control signal S1 to provide clock supply, indicating that it is enabled, regardless of the value of processing data to be processed. Moreover, if the process control signal indicates to execute processing, the content of the processing to be executed is the same content as the preceding processed content, and the value of processing data to be processed is different from the value of data used in the preceding processing, the clock-control signal generating unit 43 generates the clock control signal S1 to provide clock supply, indicating that it is enabled.

Furthermore, if the process control signal indicates to execute processing, the content of the processing to be executed is the same content as that of the preceding executed processing, and the value of processing data to be processed is equal to the value of data used in the preceding processing, the clock-control signal generating unit 43 generates the clock control signal S1 not to provide clock supply, indicating that it is disabled. Moreover, if the process control signal indicates not to execute processing, the clock-control signal generating unit 43 generates the clock control signal S1 not to provide clock supply, indicating that it is disabled, regardless of the content of the processing to be executed and the value of processing data.

Furthermore, if the process control signal indicates to execute processing, and the content of the processing to be executed is different from the preceding processed content, the clock-control signal generating unit 43 generates the clock control signal S2 to provide clock supply, indicating that it is enabled, regardless of the value of processing data to be processed.

Moreover, if the process control signal indicates to execute processing, and the content of the processing to be executed is the same content as the preceding processed content, the clock-control signal generating unit 43 generates the clock control signal S2 not to provide clock supply, indicating that it is disabled, regardless of the value of processing data. Furthermore, if the process control signal indicates not to execute processing, the clock-control signal generating unit 43 generates the clock control signal S2 not to provide clock supply, indicating that it is disabled, regardless of the content of the processing to be executed and the value of processing data.

As shown in FIG. 16, the clock-control signal generating unit 43 includes the decoder 32, the register 33, a register 44, the comparator 34, and a comparator 45. The register 44 operates synchronously the system clock, and stores therein data Dl if the execution control signal J1 is enabled. The register 44 is a register with a write enable signal.

If the value of the data D1 that is input is different from the value of a data D0 output from the register 44, the comparator 45 outputs a comparison determination signal H2 as it is enabled. By contrast, if the value of the data D1 is equal to the value of the data D0, the comparison determination signal H2 is output as it is disabled. The data D0 is data stored immediately before the data D1 is stored into the register 44.

If the execution control signal J1 extracted by the decoder 32 is enabled, and the comparison determination signal H1 is enabled, or if the execution control signal J1 is enabled, the comparison determination signal H1 is disabled, and the comparison determination signal H2 is enabled, the clock control signal S1 indicates that it is enabled. In the other cases, the clock control signal S1 indicates that it is disabled. The clock control signal S2 indicates a result of a logical product of the comparison determination signal H1 and the execution control signal J1.

The preceding processed content described in FIG. 17 mean the preceding processing executed by the semiconductor integrated circuit device 41, i.e., processing specified by the processing identifier of the process control signal at the latest time when the execution control signal of the process control signal is enabled.

For example, if the execution control signal of the process control signal input into the clock-control signal generating unit 43 is disabled in the preceding two cycles, and the execution control signal of the process control signal is enabled in the further previous cycle (three cycles ago), the processing identifier I1 stored in the register 33 is the processing identifier of the process control signal input three cycles ago.

The data used in the preceding processing described in the figure mean processing data used in the preceding processing executed by the semiconductor integrated circuit device 41, i.e., processing data processed with the processing identifier of the process control signal at the latest time when the execution control signal of the process control signal is enabled.

For example, if the execution control signal of the process control signal input into the clock-control signal generating unit 43 is disabled in the preceding two cycles, and the execution control signal of the process control signal is enabled in the further previous cycle (three cycles ago), processing data stored in the register 44 is processing data input three cycles ago.

If the content of the input process control signal indicates processing execution, and the concrete processing content is different from the preceding executed processing, the clock-control signal generating unit 43 outputs the clock control signal S1 and the clock control signal S2 as the both of them are enabled regardless of the value of processing data to be processed.

Moreover, if the content of the input process control signal indicates processing execution, the concrete processing content is the same content as that of the preceding executed processing, and the value of processing data to be processed is different from the value of data used in the preceding executed processing, the clock-control signal generating unit 43 outputs the clock control signal S1 as it is enabled, and the clock control signal S2 as it is disabled.

Furthermore, if the content of the input process control signal indicates processing execution, the concrete processing content is the same content as that of the preceding executed processing, and the value of processing data to be processed is equal to the value of data used in the preceding executed processing, the clock-control signal generating unit 43 outputs the clock control signal S1 and the clock control signal S2 as the both of them are disabled.

Moreover, if the content of the input process control signal indicates inexecution of processing, the clock-control signal generating unit 23 outputs the clock control signal S1 and the clock control signal S2 as the both of them are disabled, regardless of the content of the processing to be executed.

The operation unit 24 includes the clock gating circuit 25, the operation block 26, and the delay circuit 27. The operation block 26 includes the conversion circuit 8, the operation circuit 9, the first register 30, and the second register 31. The conversion circuit 8 includes the memory 12 and the MUX 13.

In this way, according to the semiconductor integrated circuit device of the third embodiment, when the content of requested processing and data to be processed are the same content and the same data as the content of and the data used in the preceding processing, the clock-control signal generating unit outputs a clock control signal not to provide clock supply, and the clock gating circuit does not generate a gated clock signal to store a process control signal newly. Consequently, the operation unit uses the process control signal already stored in the internal register, and the register does not need to perform operation of newly storing therein the same process control signal, so that power consumption can be reduced.

The first to the third embodiments are explained above in an assumption that the operation units have the same configuration and the same functions, however, when the operation units use a common identifier, the operation unit can have different configurations. For example, an ALU included in the operation circuit in each of the operation units can have a different command set.

According to the first to the third embodiments, the delay circuit is used as a circuit that outputs a clock control signal to be synchronous with processed data (operation result) and a process control signal to the operation unit connected downstream. However, a circuit in any form can be used as long as a clock control signal, processed data (operation result), and a process control signal are synchronously output by the circuit to the operation unit connected downstream.

According to one aspect of the present invention, clock supply to each of operation units can be separately controlled by inputting a clock control signal generated by the clock-control signal generating unit from a process control signal generated by the process control unit only into the first operation unit among the operation units included in the pipeline. Accordingly, all of a plurality of operation units can be controlled with a simple structure by one clock-control signal generating unit, so that power consumption can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit device comprising:
a plurality of operation units connected in a pipeline structure, each performing an operation processing on data;
a process control unit that operates in synchronization with a system clock signal and generates a process control signal for controlling the operation units upon receiving a data notification signal that notifies an arrival of data from outside; and
a clock-control signal generating unit that operates in synchronization with the system clock signal and generates a clock control signal for controlling a clock supply to each of the operation units upon receiving the process control signal, wherein
each of the operation units includes
a clock gating circuit that operates in synchronization with the system clock signal and generates a gated clock signal for operating the operation unit based on the clock control signal,
an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal, wherein the clock control signal includes a first clock control signal and a second clock control signal, the first clock control signal indicates to perform the clock supply when the process control signal indicates an execution of a processing, and otherwise, not to perform the clock supply, the second clock control signal indicates to perform the clock supply when the process control signal indicates an execution of a processing and a content of the processing is different from a content of a previously executed processing, and indicates not to perform the clock supply when the process control signal indicates an execution of a processing, a content of the processing is same as a content of a previously executed processing, and the process control signal does not indicate an execution of a processing.

2. The semiconductor integrated circuit device according to claim 1, wherein the clock gating circuit outputs a first gated clock signal when the first clock control signal indicates to perform the clock supply, does not output the first gated clock signal when the first clock control signal indicates not to perform the clock supply, outputs a second gated clock signal when the second clock control signal indicates to perform the clock supply, and does not output the second gated clock signal when the second clock control signal indicates not to perform the clock supply, and the operation block outputs the processed data in synchronization with the first gated clock signal, and outputs the process control signal in synchronization with the second gated clock signal.

3. A semiconductor integrated circuit device comprising:

a plurality of operation units connected in a pipeline structure, each performing an operation processing on data;

a process control unit that operates in synchronization with a system clock signal and generates a process control signal for controlling the operation units upon receiving a data notification signal that notifies an arrival of data from outside; and a clock-control signal generating unit that operates in synchronization with the system clock signal and generates a clock control signal for controlling a clock supply to each of the operation units upon receiving the process control signal, wherein each of the operation units includes a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal, wherein the clock control signal includes a first clock control signal and a second clock control signal, the first clock control signal indicates to perform the clock supply when the process control signal indicates an execution of the processing, a content of the processing is different from a content of a previously executed processing, and when the process control signal indicates an execution of a processing, a content of the processing is same as a content of a previously executed processing, and a value of the data is different form a value of data processed in a previously executed processing, and indicates not to perform the clock supply when the process control signal indicates an execution of a processing, a content of the processing is same as a content of a previously executed processing, and a value of the data is equal to a value of data processed in a previously executed processing, and when the process control signal does not indicate an execution of a processing, the second clock control signal indicates to perform the clock supply when the process control signal indicates an execution of a processing and a content of the processing is different from a content of a previously executed processing, and indicates not to perform the clock supply when the process control signal indicates an execution of a processing and a content of the processing is same as a content of a previously executed processing, and when the process control signal does not indicate an execution of a processing.

4. The semiconductor integrated circuit device according to claim 3, wherein the clock gating circuit outputs a first gated clock signal when the first clock control signal indicates to perform the clock supply, does not output the first gated clock signal when the first clock control signal indicates not to perform the clock supply, outputs a second gated clock signal when the second clock control signal indicates to perform the clock supply, and does not output the second gated clock signal when the second clock control signal indicates not to perform the clock supply, and the operation block outputs the processed data in synchronization with the first gated clock signal, and outputs the process control signal in synchronization with the second gated clock signal.

5. A semiconductor integrated circuit device comprising:

a plurality of operation units connected in a pipeline structure, each performing an operation processing on data;

a process control unit that operates in synchronization with a system clock signal and generates a process control signal for controlling the operation units upon receiving a data notification signal that notifies an arrival of data from outside; and a clock-control signal generating unit that operates in synchronization with the system clock signal and generates a clock control signal for controlling a clock supply to each of the operation units upon receiving the process control signal, wherein each of the operation units includes a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal, wherein the process control signal includes an execution control signal that indicates whether the operation unit is to execute the processing and a processing identifier that specifies the processing to be executed by the operation unit, and the operation block includes a conversion circuit that converts the processing identifier into a form executable by the operation block.

6. The semiconductor integrated circuit device according to claim 5, wherein the conversion circuit includes a memory, and the processing identifier is an address pointer of the memory.

7. The semiconductor integrated circuit device according to claim 5, wherein the conversion circuit includes a plurality of registers, and the processing identifier is a select signal of a multiplexer.

8. A clock control method for a semiconductor integrated circuit device including a plurality of operation units connected in a pipeline structure, each performing an operation processing on data, a process control unit that operates in synchronization with a system clock signal and generates a process control signal for controlling the operation units upon receiving a data notification signal that notifies an arrival of data from outside, and a clock-control signal generating unit that operates in synchronization with the system clock signal and generates a clock control signal for controlling a clock supply to each of the operation units upon receiving the process control signal, each of the operation units including a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal, the clock control method comprising:

outputting including the clock control unit outputting a first clock control signal; and outputting including the clock control unit outputting a second clock control signal, wherein the first clock control signal indicates to perform the clock supply when the process control signal indicates an execution of a processing, and otherwise, not to perform the clock supply, and the second clock control signal indicates to perform the clock supply when the process control signal indicates an execution of a processing and a content of the processing is different from a content of a previously executed processing, and indicates not to perform the clock supply when the process control signal indicates an execution of a processing and a content of the processing is same as a content of a previously executed processing, and when the process control signal does not indicate an execution of a processing.

9. A clock control method for a semiconductor integrated circuit device including a plurality of operation units connected in a pipeline structure, each performing an operation processing on data, a process control unit that operates in synchronization with a system clock signal and generates a process control signal for controlling the operation units upon receiving a data notification signal that notifies an arrival of data from outside, and a clock-control signal generating unit that operates in synchronization with the system clock signal and generates a clock control signal for controlling a clock supply to each of the operation units upon receiving the process control signal, each of the operation units including a clock gating circuit that operates in synchronization with the system clock signal and generates a gated clock signal for operating the operation unit based on the clock control signal, an operation block that operates in synchronization with the gated clock signal, performs a processing instructed by the process control signal on the data upon receiving the data and the process control signal, and outputs processed data and the process control signal to a subsequent operation unit, and an output circuit that outputs the clock control signal to the subsequent operation unit upon receiving the clock control signal such that the clock control signal is synchronized with the processed data and the process control signal, the clock control method comprising:

outputting including the clock control unit outputting a first clock control signal; and outputting including the clock control unit outputting a second clock control signal, wherein the first clock control signal indicates to perform the clock supply when the process control signal indicates an execution of a processing and a content different from a content of preceding executed processing, and when the process control signal indicates an execution of a processing, a content of the processing is same as a content of a previously executed processing, and a value of the data is different form a value of data processed in the previously executed processing, and indicates not to perform the clock supply when the process control signal indicates an execution of a processing, a same content as a content of a previously executed processing, and a value of the data is equal to a value of data processed in the previously executed processing, and when the process control signal does not indicate an execution of a processing, and the second clock control signal indicates to perform the clock supply when the process control signal indicates an execution of a processing and a content of the processing is different from a content of a previously executed processing, and indicates not to perform the clock supply when the process control signal indicates an execution of a processing and a content of the processing is same as a content of a previously executed processing, and when the process control signal does not indicate an execution of a processing.

10. A clock control method for a semiconductor integrated circuit device including
- a plurality of operation units connected in a pipeline structure, each of the operation units performing an operation processing on data,
- a process control unit that operates in synchronization with a system clock signal and generates a process control signal for controlling the operation units upon receiving a data notification signal that notifies an arrival of data from outside, and
- a clock-control signal generating unit that operates in synchronization with the system clock signal and generates a clock control signal for controlling a clock supply to each of the operation units upon receiving the process control signal, each of the operation units including
  - a clock gating circuit that operates in synchronization with the system clock signal and generates a gated clock signal for operating the operation unit based on the clock control signal,
  - an operation block that
    - operates in synchronization with the gated clock signal,
    - performs a processing instructed by the process control signal on the data upon receiving the data and the process control signal, and
    - outputs processed data and the process control signal to a subsequent operation unit, and
  - an output circuit that outputs the clock control signal to the subsequent operation unit upon receiving the clock control signal such that the clock control signal is synchronized with the processed data and the process control signal, the clock control method comprising:

outputting including the clock control unit outputting a first clock control signal; and outputting including the clock control unit outputting a second clock control signal, wherein
- the process control signal includes an execution control signal that indicates whether the operation unit is to execute a processing and a processing identifier that specifies the processing to be executed by the operation unit, and
- the operation block includes a conversion circuit that converts the processing identifier into a form executable by the operation block.

* * * * *